United States Patent [19]

Gericke et al.

[11] Patent Number: 5,530,943
[45] Date of Patent: Jun. 25, 1996

[54] METHOD FOR PRODUCING AN EXECUTABLE CONFIGURATION OF A SYSTEM PROGRAM LOADABLE INTO A SYSTEM MEMORY AREA OF A PROCESSOR SYSTEM

[75] Inventors: Harald Gericke, Oberhausen; Reinhard Koeninger, Gelsenkirchen; Peter Fischer, Witten, all of Germany

[73] Assignee: Siemens Aktiengesellschaft, Munich, Germany

[21] Appl. No.: 950,653

[22] Filed: Sep. 23, 1992

[30] Foreign Application Priority Data

Sep. 30, 1991 [EP] European Pat. Off. ............... 91116726

[51] Int. Cl.⁶ .................................. G06F 9/00; G06F 9/06
[52] U.S. Cl. ........................... 395/775; 395/600; 395/427; 340/825.22; 364/148; 364/221.1; 364/245
[58] Field of Search ....................... 395/425, 700, 395/775, 600, 427; 340/172.5, 825.22

[56] References Cited

U.S. PATENT DOCUMENTS

| | | | |
|---|---|---|---|
| 4,028,684 | 6/1977 | Divine et al. | 340/172.5 |
| 4,400,798 | 8/1983 | Francis et al. | 365/174 |
| 4,432,056 | 2/1984 | Aimura | 364/200 |
| 4,610,000 | 9/1986 | Lee | 365/189 |
| 4,769,767 | 9/1988 | Hilbrink | 364/200 |
| 4,943,911 | 7/1990 | Kopp et al. | 364/200 |
| 5,029,078 | 7/1991 | Iwai | 364/200 |
| 5,155,837 | 10/1992 | Liu et al. | 395/500 |
| 5,237,681 | 8/1993 | Kagan | 395/600 |
| 5,317,306 | 5/1994 | Abraham et al. | 345/118 |

FOREIGN PATENT DOCUMENTS

| | | |
|---|---|---|
| 0195823 | 10/1986 | European Pat. Off. . |
| 0335812 | 2/1989 | European Pat. Off. . |
| 0338290 | 3/1989 | European Pat. Off. . |
| 61-206049 | 9/1986 | Japan . |

*Primary Examiner*—Thomas C. Lee
*Assistant Examiner*—Rehana Krick
*Attorney, Agent, or Firm*—Hill, Steadman & Simpson

[57] ABSTRACT

A method enables a system program to automatically fashion itself into a system program version matched to the storage capacity of a system memory when loaded into a system memory of a program-controlled processing equipment. To this end, the system program is subdivided into a basic program module and into at least one supplementary program module. A program loading sequence first causes the storing of the basic program module and calculates the available storage capacity. Depending on available storage capacity, storing of program sequences of the supplementary program module may then be enabled. A branch address list onto program sequences of the supplementary program module is deposited in the basic program module. The addresses of the program sequences which are not loaded may be modified in the branch address list.

2 Claims, 2 Drawing Sheets

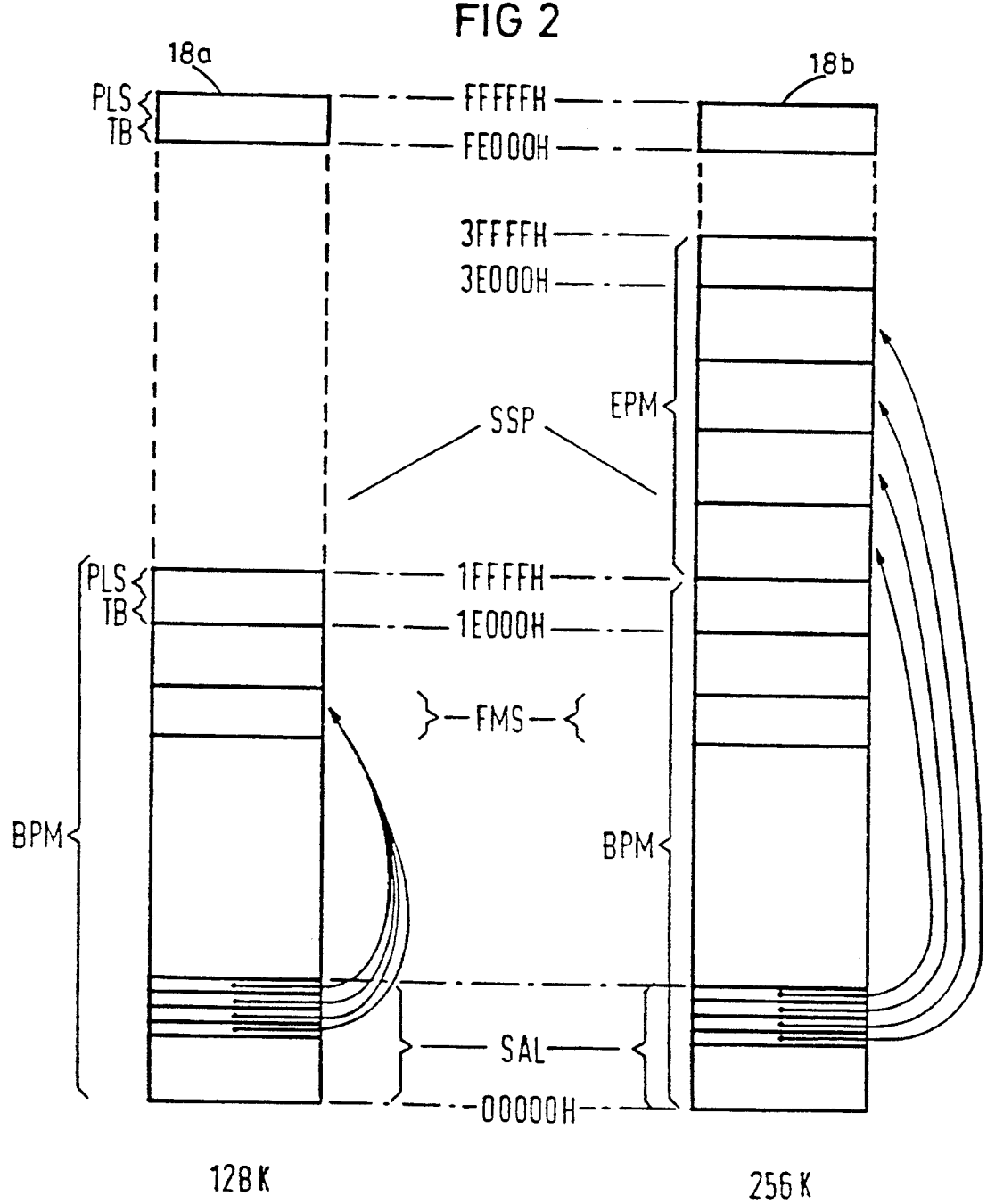

METHOD FOR PRODUCING AN EXECUTABLE CONFIGURATION OF A SYSTEM PROGRAM LOADABLE INTO A SYSTEM MEMORY AREA OF A PROCESSOR SYSTEM

BACKGROUND OF THE INVENTION

The present invention is generally related to a method for producing an executable configuration of a system program entirely or partially loadable into a system memory area of a processor system depending on the available storage capacity in a system memory area.

To achieve an optimally high degree of functional flexibility in program-controlled processing equipment, software, i.e. the system program to be executed by a processor system of the program-controlled process equipment, may not be unmodifiably programmed into read only memory modules. On the contrary, every time the program-controlled processing equipment is switched on, the system program may be loaded from an external storage medium into a system memory area of the processing system which is provided with write/read memory modules. Program modifications and additions may be undertaken given loadable system programs without operations performed on hardware of the program-controlled processing system. A new version of the system program containing the modification or addition is produced by the manufacture of the system program or, respectively, the program-controlled processing equipment, for example, may be deposited on a floppy disk that is then made available to the user of the program-controlled processing equipment. When loading the system, the new version of the system program is then transmitted into the system memory instead of the previous version.

When the functional scope of program-controlled processing equipment is to be expanded, the system program must be supplemented by appropriate program sequences. This may then result in the storage capacity available in the system memory for loading the system program being no longer adequate to accept a new, augmented version of the system program. Users of such program-controlled processing equipment which require the functions which may be executed with the new version of the system program must, therefore, incur a cost-intensive enlargement of the system memory.

On the other hand, users having no need for the additional functions or for whom the cost outlay for a memory expansion is not economically justifiable cannot be expected to forego improvements and corrections in the functional scope of the system program which was previously employed because modifications in the previous functional scope are only undertaken in the versions of the system program that expand a functional scope, and the memory configuration in the program processing equipment of the user is not adequate for loading these new versions of the system program.

The manufacturers of program-controlled processing equipment and their system programs usually counter this problem by offering and servicing a plurality of system program versions for the same type of program-controlled processing equipment depending on the memory capacity available in the system memory.

Such an offering and servicing of system program versions requires a new version to be prepared for all system program versions affected by the change which is given every change in the system program. For the manufacture of the system program, "software care" involves considerable outlay under these conditions particularly given a multitude of system program versions to be handled, for example, for producing, archiving and allocating versions.

SUMMARY OF THE INVENTION

It is, therefore, an object of the present invention to avoid the making and forming of versions given loadable system programs due to different memory capacities of system memories.

The system program may fashion itself into a system program version matched to the storage capacity of the system memory when loaded into the system memory of the program-controlled processing equipment.

The part of the system program forming the basic program module represents a type of minimal configuration for which even the smallest possible storage capacity may be adequate. When storage capacity is still available after the storing of the basic program module, program sequences of the supplementary program module may be loaded into the system memory. A branch address list with the system memory addresses the program sequences of the supplementary program module deposited in a basic program module serves as an interface between a basic program module and a supplementary program module.

A program-oriented access—usually an "indirect call"— from the basic program module onto the program sequences of the supplementary program module may be implemented through the branch address list. The system memory addresses of program sequences of the supplementary program module which were incapable of being loaded when loading the system program due to inadequate storage capacity may be erased or modified by a program loading sequence such that accesses onto non-existent program sequences during a processing of the system program may not occur.

Additional features and advantages of the present invention are described, and will be apparent from, the detailed description of the presently preferred embodiments and from the drawings.

BRIEF DESCRIPTION OF THE DRAWINGS

FIG. 2 is a diagram symbolically illustrating the system memory occupation given two different storage capacities.

DETAILED DESCRIPTION OF THE PRESENTLY PREFERRED EMBODIMENTS

Figure 1:
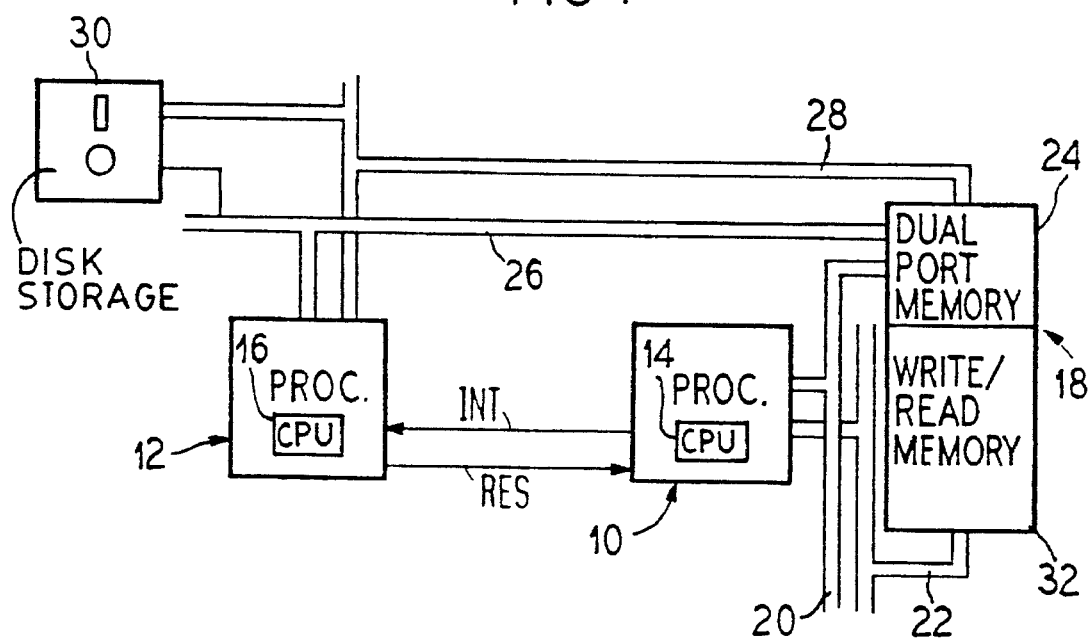
FIG. 1 is a block circuit diagram schematically illustrating a hardware configuration in program-controlled processing equipment.

The present invention is based on a program-controlled communication system whose system program is respectively loaded into a system memory from a floppy disk when the communication system is switched on.

FIG. 1 schematically illustrates a hardware system configuration for controlling a communication system which includes a first processor system 10 and a second processor system 12. Each processor system 10 and 12 include microprocessors 14 and 16, respectfully. A system memory 18 allocated to the first processor system 10 may be connected to the processor system 10 through an address bus 20 and a data bus 22. The system memory 18 may include a plurality of semi-conductor memory modules which include freely addressable memory cells for reading and writing accesses, i.e. random access memory (RAM).

One part of the system memory 18 includes a dual port memory 24 connected to the address bus 20 and the data bus 22 of the first processor system 10 with a first access channel and may be connected to a second address bus 26 and second data bus 28 of the second processor system 12 through a second access channel. A floppy disk storage means 30 may also be connected to the second address bus 26 and second data bus 28 of the second processor system 12.

For loading a system program into the system memory 18, a program loading sequence is first read by the second processor system 12 from a floppy disk situated in the floppy disk storage means 30 and may be transferred into the dual port memory 24 of the system memory 18. The dual port memory 24 may be arranged such that the address space of the microprocessor 14 of the first processor system 10 may immediately begin to process the program loading sequence when a reset signal RES generated by the second processor system 12 arrives.

During the processing of the program loading sequence, the first processor system 10 may report a plurality of interrupt signals INT to the second processing system 12. Each of the plurality of interrupt signals INT may cause the second processor system 12 to successively transfer the system program deposited on the floppy disk in the floppy disk storage means 30 in the form of program blocks into the dual port memory 24.

To this end, a transfer memory area may be available in a dual port memory 24, and a respective program block of the system program may be written into the transfer memory area by the second processor system 12. The program block may then be transferred into a write/read memory area 32 of the system memory 18 when the program loading sequence is processed by the microprocessor 14. The second processor system 12 may then be initialized to transmit the respective next program block with an interrupt signal INT.

The system program to be loaded may then be subdivided into a basic program module and a supplementary program module having optionally loadable program sequences. For this reason, the basic program module may first be loaded into the system memory 18. Subsequently, the program loading sequence identifies the amount of storage capacity available in the system 18. This usually occurs by writing and subsequent reading access in the address range where given a coincidence of the read and the written value, it may be assumed that a memory cell is located at the address in the address range identified by the access.

Depending on how much storage capacity the program loading sequence has identified as being available in a system memory, additional interrupt signals INT may be sent to the second processor system 12. A transfer of further program blocks of the system program or of program sequences of the supplementary program module may be sent therewith. Program sequences of the supplementary program module may be loaded until the storage capacity of the system memory 18 available for storing the system program has been exhausted. If all program sequences of the supplementary program module are incapable of being loaded into the system memory 18, the program loading sequence reworks a branch address list in the basic program module.

The branch address list in which the appertaining system memory address for every program sequence of the supplementary program under which the appertaining program sequence is deposited given adequate storage capacity in a system memory, serves as a program-oriented interface between the basic program module and the program sequences of the supplementary program module. A handling of program sequences of the supplementary program module may only be possible through an indirect branch, particularly an indirect call onto the system memory addresses deposited in the branch address list. The program loading sequence may modify the system memory addresses of program sequences that are not loaded into the address of a program sequence that serves the purpose of generating an error message. The program sequence may be located in the basic program module.

The program sequences required for the critical functions of the program-controlled processing equipment may be deposited in the basic program module. The program sequences which may implement additional functions may be transferred into the supplementary program module. In a communication system, for example, the program sequences for the implementation of performance features which are insignificant for the critical, basic functions of a communication system may be deposited in the supplementary program module.

When such a performance feature is activated during operation of the communication system, an error message may result which indicates the non-presence of the appertaining program sequence and rejects the activation of the performance feature.

FIG. 2 illustrates a memory occupation for a system memory 18 having a 128 KByte memory capacity and a system memory 18 having a 256 KByte memory capacity. Whether the system memory 18 includes a 128 KByte memory capacity or 256 KByte memory capacity, dual port memory 18a or 18b having a storage capacity of 8 KBytes may be reached at the end of the first 128 KBytes in the address range denoted as 1E000H through 1FFFFH, and may be reached at the end of the entire address range denoted as FE000H through FFFFFH.

Since the second processor system 12 (shown in FIG. 1) does not know when loading the system program how large the memory configuration in the system memory 18 actually is, proceeding on the basis of the smallest possible memory configuration is first attempted. In the present case, this is a memory configuration of 128 KBytes. The program loading sequence PLS is transferred by the second processor system 12 into the upper 4 KBytes denoted 1E000H through 1FFFFFH of the memory area. As already mentioned, the dual port memory 18a and 18b is situated at this location. This may also be reached at the end of the entire address range which also contains the reset address of the microprocessor 14.

The dual port memory 18a and 18b may be organizationally subdivided into two 4 KByte memory areas. The area which is placed higher in terms of address may accept the program loading sequence PLS, and the area lower in terms of address may serve as a transfer memory area TB for block-by-block transfer of the system program.

After the basic program module BPM has been properly deposited in the system memory 18 by the program loading sequence PLS in cooperation with the second processor system 12, the program loading sequence PLS determines whether the storage capacity in the system memory 18 includes enough storage capacity which is required for depositing the program sequences of the expansion program module EPM.

When this is the case, as given the memory configuration having 256 KBytes shown in FIG. 2, then the program sequences of the expansion program module EPM may be stored in the system memory 18 by the program loading sequence PLS beginning with the address 2000H. When, however, a memory configuration of only 128 KBytes is present, which does not allow a loading of program sequences of the expansion program module EPM, then the program loading sequence PLS erases the addresses in a branch address list SAL which are directed onto the program sequences of the expansion program module and may note the address of an error message program sequence FMS in a basic program module BPM at the location of the previous addresses.

It should be understood that various changes and modifications to the presently preferred embodiments described herein will be apparent to those skilled in the art. Such changes and modifications may be made without departing from the spirit and scope of the present invention and without diminishing its attendant advantages. It is, therefore, intended that such changes and modifications be covered by the appended claims.

We claim:

1. A method for producing an e executable configuration of a system program at least partially loadable into a system memory area of a processor system depending on available storage capacity in said system memory area, said system program being subdivided into a basic program module for which adequate storage capacity in the system memory area is assured and at least into one supplementary program module wherein said system memory addresses of program sequences belonging to said supplementary program module, the method comprising the steps of:

loading a program loading sequence into said system memory area;

initiating processing of said program loading sequence;

initiating storing of said program module into said system memory area;

calculating available storage capacity;

initiating a storing or program sequences of said supplementary program module into said system memory area based on said calculated available storage area;

replacing said system memory addresses of program sequences of said supplementary program module that are not allowed due to lack of storage capacity in said branch address list by an address of a program sequence of said basic program module that generates an error message;

said processor system provided for control of a communication system; and said program sequences of said supplementary program module fashioned for implementation of a respective performance feature of said communication system.

2. The method according to claim 1 further comprising the steps of:

depositing said program loading sequence into a dual port memory port of said system memory area by a further processor system;

generating messages directed to said further processor system upon execution of the program loading sequence wherein said messages cause said further processor system to successively deposit a part of the system program in a dual port memory; and transferring said part of the system program by the program loading sequence to the address in a system memory area required for executing said system program.

* * * * *